April 25, 1967     N. S. COLLINS     3,315,292
RAMP
Filed Oct. 7, 1964
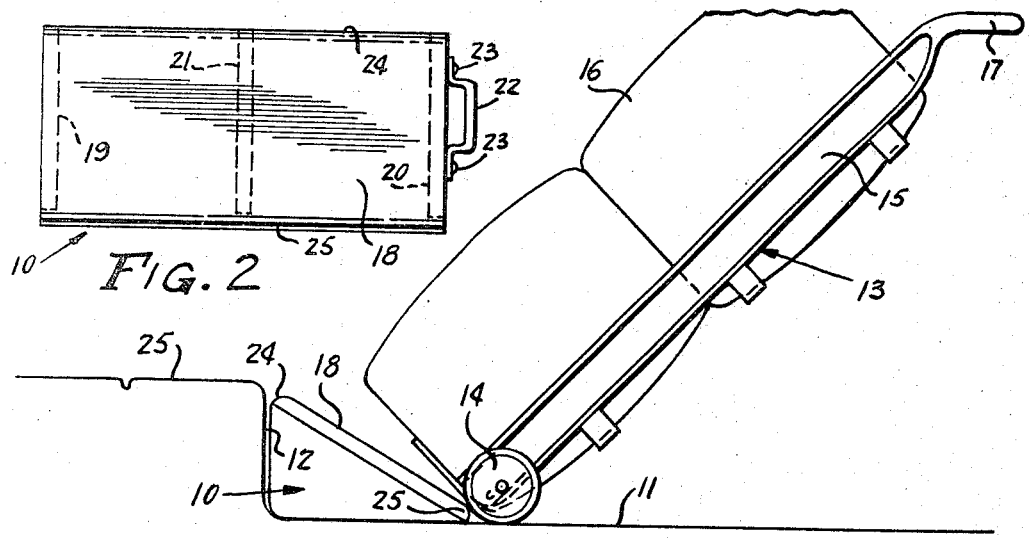
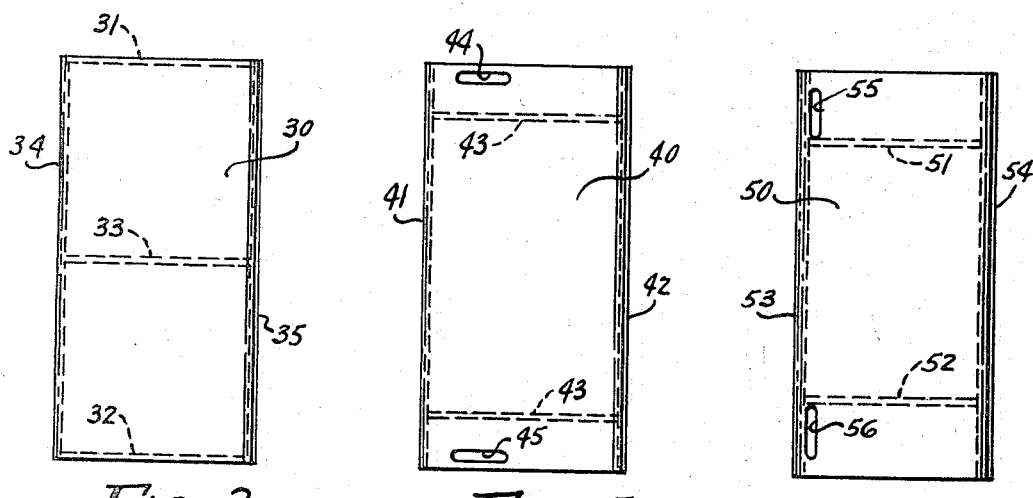
INVENTOR.
NATHANIEL S. COLLINS
BY *Alexander B. Blair*
ATTORNEY.

United States Patent Office 3,315,292
Patented Apr. 25, 1967

3,315,292
RAMP
Nathaniel S. Collins, Washington, D.C.
(1604 Shenandoah Road, Alexandria, Va. 22308)
Filed Oct. 7, 1964, Ser. No. 402,260
1 Claim. (Cl. 14—72)

This invention relates to a ramp, and more particularly to a ramp adapted to be positioned adjacent a curb to facilitate the movement of a loaded hand truck thereover.

A primary object of this invention is the provision of a portable ramp, which may be readily carried in a delivery vehicle, and which may be positioned adjacent and removed from a position close to a curbstone, to facilitate the maneuvering of hand trucks containing heavy articles, such as beer kegs, cases, or the like, over the curb, and reduce to a minimum the physical effort required for such manipulation.

As conducive to a clearer understanding of this invention, it may here be pointed out that in the loading and unloading of beer kegs, liquor cases, and other relatively heavy packaged commodities, it is frequently desirable that a plurality of these articles be loaded on a hand truck. In cases where deliveries have hitherto been made from a vehicle parked in the street, it has frequently been necessary to lift such hand trucks and their loads over relatively high curbstones. This has been difficult for the drivers, and has required great physical effort, and sometimes resulted in injury to the driver.

It is an object of this invention therefore to provide a portable ramp which may be readily carried in a delivery vehicle, and positioned adjacent the curb, in such manner that the loaded hand truck may be wheeled thereover with a minimum of effort and difficulty, and thus decrease the physical exertion required by the driver and reduce the possibility of rupture or other injury incident to such work.

A further object of the invention is the provision of a device of this character provided with handle means whereby the same may be readily positioned and removed from position with a minimum of effort and difficulty.

An additional object of the invention is the provision of a ramp of this character which is constructed of such light-weight materials as to reduce the effort of placing and removing the same to a minimum.

A further object of the invention is the provision of a device of this character of adequate strength to carry relatively heavy loads, but at the same time retaining its lightweight feature.

Other objects reside in the combinations of elements, arrangements of parts, and features of construction, all as will be more fully pointed out hereinafter and disclosed in the accompanying drawing wherein there are shown preferred embodiments of this inventive concept.

In the drawings:

FIGURE 1 is a side elevational view showing one form of ramp constructed in accordance with the instant invention positioned adjacent a curb, and showing a hand truck being wheeled thereover.

FIG. 2 is a top plan view of the ramp of FIG. 1, certain concealed parts being indicated in dotted lines.

FIG. 3 is a plan view of a modified form of a ramp, concealed parts being indicated in dotted lines.

FIG. 4 is an end elevational view of the ramp of FIG. 3.

FIG. 5 is a view similar to FIG. 3 showing a further modified form of construction.

FIG. 6 is an end elevational view of the ramp of FIG. 5.

FIG. 7 is a top plan view of still another modified form of ramp construction, similar to FIGS. 3 and 5, and, FIG. 8 is an end elevational view of the ramp shown in FIG. 7.

Similar reference characters refer to similar parts throughout the several views of the drawing.

Having reference now to the drawing in detail, and more particularly to FIG. 1, there is generally indicated at 10 a ramp constructed in accordance with the instant invention, positioned in the street or gutter 11 immediately adjacent a raised curb 12. A lifting truck is generally indicated at 13, and includes wheels 14, and a bed 15, adapted to carry a load 16 which, in the illustrative embodiment is shown as kegs or barrels. Handles 17 are adapted to be grasped by the operator, and the truck wheeled up the top inclined surface 18 of the ramp 10.

As shown in FIG. 2, the ramp 10 consists of a top sheet 18 which is supported by triangular end pieces 19 and 20, and which, in this embodiment of the invention, is provided with a center triangular reinforcing piece 21. One of the end plates 19 or 20 is provided, in this modification, with a raised handle 22 secured to the end plate by means of rivets or bolts 23. The upper and lower longitudinal edges of sheet 18 are curved or rounded as at 24 and 25 respectively, thus reducing the possibility of injury to the operator over sharp edges, and at the same time permitting ready wheeling of the wheels 14 of the lift truck thereover. The curvature is not sufficiently great to provide any material gap between the street level, and the sidewalk level shown at S above the curb 12.

The raised handle on the one end may be employed to lift the ramp in and out of the vehicle, and facilitate positioning of the same adjacent the curb for removal therefrom with a minimum of effort.

FIGS. 3 and 4 disclose a modified form of construction, including a sheet 30, which is supported by inclined triangular end pieces 31 and 32, which has a central reinforcing piece 33 and rounded longitudinal edges 34 and 35. In this modification each end plate 31 and 32 is provided with an elongated transverse finger opening 36, by means of which the device may be readily manipulated and shifted from place to place.

A similar ramp is shown in FIGS. 5 and 6, and includes a top inclined sheet 40 having rounded upper and lower edges 41 and 42, and end pieces 43 and 43a which are inset relatively from the ends of the device, and eliminate the need for a reinforcing center piece. In this modification elongated finger openings 44 and 45 extend through the sheet 40 adjacent the ends thereof, and adjacent the upper arcuate edge 41 exteriorly of the respective end plates 43, and extending in parallelism therewith. This construction permits ready and efficacious handling of the device from either end.

FIGS. 7 and 8 disclose a further modified form of construction including an inclined sheet 50 and end plates 51 and 52. In this form of the invention the upper and lower edges 53 and 54 are not only arcuate, but are rolled, as best shown in FIG. 8, to provide increased strength for the ramp. Elongated finger openings 55 and 56 are provided adjacent the upper rolled edge 53 and in parallelism therewith exteriorly of the end pieces 51 and 52. Additional elongated hand openings 57 may also be provided in the end pieces adjacent the lower edges thereof, as best shown in FIG. 8. By means of this arrangement the ramp may be grasped, from almost any angle, so that the manipulation thereof is still further facilitated.

The ramp may be made of any suitable material such as metal, preferably a lightweight metal such as aluminum, heavy plastic material, or, if desired, wood, as long as the weight is kept to a minimum and adequate strength for the support of heavy loads is assured.

From the foregoing it will now be seen that there is herein provided an improved ramp construction, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A ramp adapted to be positioned against a curbstone to facilitate the movement of wheeled hand trucks thereover comprising, a flat inclined sheet of relatively light strong material, substantially triangular supporting pieces secured to the underside of said sheet and supporting the same at an incline, the maximum height of said end pieces being substantially equal to the height of the average curb, said end pieces being spaced inwardly from the ends of said sheet to provide spaced reinforcement therefor, handle means carried by said end pieces so arranged that said sheet may be stood on end in flush relation without interference from said handle means, the upper and lower transverse edges of said sheet being formed into tubular transverse rolls on the underside thereof to provide transverse reinforcement against bending, said substantially triangular supporting pieces having the extremities of the hypotenuse thereof conforming to the external contour of said tubular rolls and being fixedly secured in supporting relation thereto, the outer sides of said rolls forming arcuate surfaces facilitating the passage of the wheels of a hand truck thereover.

References Cited by the Examiner

UNITED STATES PATENTS

| | | | |
|---|---|---|---|
| 1,144,836 | 6/1915 | Green | 14—72 |
| 2,496,445 | 2/1950 | Daniels | 14—72 |
| 2,629,120 | 2/1953 | Nelson | 14—72 |
| 2,779,958 | 2/1957 | Hodges | 14—72 |
| 3,184,773 | 5/1965 | Breneman | 14—72 |

FOREIGN PATENTS

| | | |
|---|---|---|
| 480,155 | 1/1952 | Canada. |
| 220,655 | 4/1962 | Austria. |

JACOB L. NACKENOFF, *Primary Examiner.*